Nov. 22, 1966  J. M. A. TANKE  3,286,403
METHOD AND DEVICE FOR ARTIFICIALLY POLLINATING PLANTS
Filed March 5, 1964  2 Sheets-Sheet 1

Nov. 22, 1966  J. M. A. TANKE  3,286,403
METHOD AND DEVICE FOR ARTIFICIALLY POLLINATING PLANTS
Filed March 5, 1964                                    2 Sheets-Sheet 2

United States Patent Office 3,286,403
Patented Nov. 22, 1966

3,286,403
METHOD AND DEVICE FOR ARTIFICIALLY
POLLINATING PLANTS
Johannes Mathernus Antonius Tanke, Oosteinde 63,
Wateringen, Netherlands
Filed Mar. 5, 1964, Ser. No. 349,606
Claims priority, application Netherlands, Mar. 8, 1963,
289,992
10 Claims. (Cl. 47—1.41)

The invention relates to a method and devices for artificially pollinating plants, in particular tomato vines cultivated in greenhouses.

Therein, the plants grow along and are fastened to substantially vertically extending climbing ropes, which are supported by strings, extending substantially in a horizontal direction over the rows of plants.

The usual manner of pollen transport under natural conditions is effected for instance by air displacement, whereby the ripe pollen looses hold of the stamens and the pistils are pollinated.

Considerable difficulties are especially experienced in greenhouses in relation to this natural pollination, because the air displacement is only obtained upon airing the greenhouses and then only to an extent which does not always suffice in order to obtain an adequate pollination, as has been experienced in practice. Especially it is important that all of the prime flowers are anyhow treated so as to cause fertilization, with a view to the financial aspect, because just the setting of the prime flowers will produce a yield of those products which, on an average, will result in high prices.

Usually the pollen of the available open flowers matures simultaneously and when this opportunity is not seized this may result in the pollen losing its fertility and that setting can no longer take place.

Additional difficulties are experienced in that the pollen mostly matures at sunset, often few laborers being available at that time.

This inconvenience was attempted to be obviated hereinbefore in that on a large surface the flowers of the plants were simultaneously moved to effect the pollination and to reduce the time required therefore. There was applied, however, an intermittent motion by displacing the plants as a unit under stress and suddenly replacing them with relief of stress, in order to overcome the great inertia of the mass of plants. This kind of motion has the disadvantage that there is a great risk of injuring the plants by snapping, whilst the effect on pollination was not satisfactory. The principal object of the present invention is to obtain a method and a device for executing artificial pollination with a high degree of certainty, and without running the risk of the plants being injured by snapping.

It is a further object of the invention to simplify the device for pollination. Other objects will follow from the following description of various embodiments, which is to be read in connection with the accompanying drawing, in which.

Figure 3:
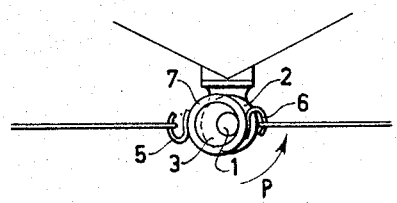
Figure 4:
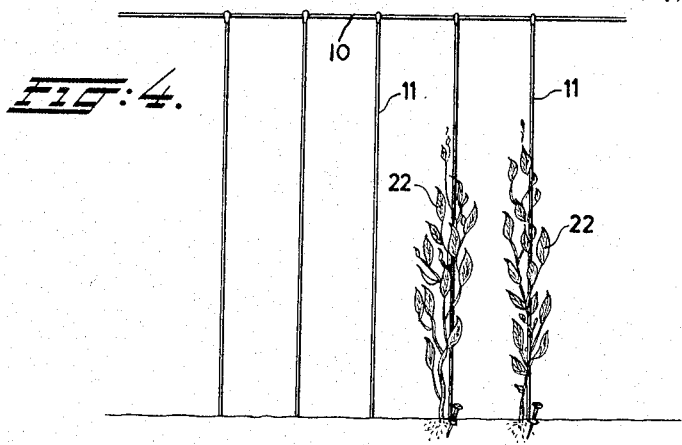
Figure 5:
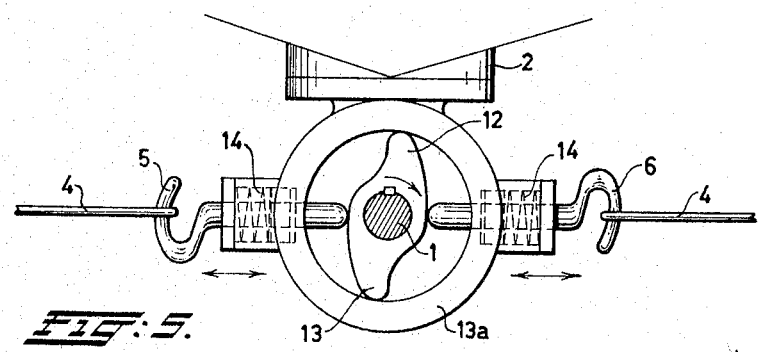
Figure 6:
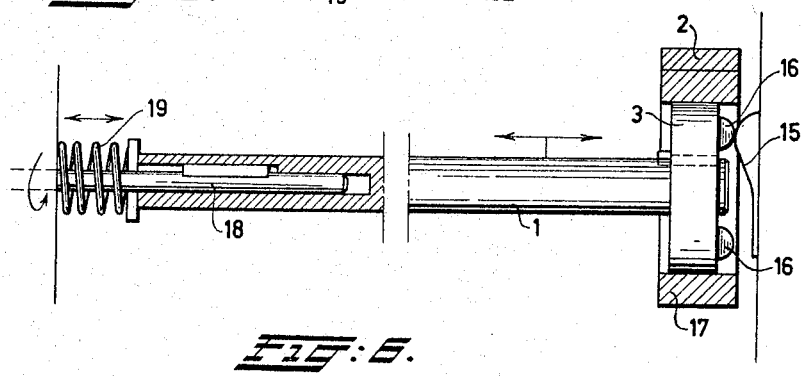

FIGURE 3 shown on an enlarged scale a detail of the driving mechanism according to a cross section through the driving shaft;

FIGURE 4 is a side elevation view, also to an enlarged scale, of a row of plant with climbing ropes, secured to a string;

FIGURE 5 shows in a way similar to FIGURE 3, but to a still enlarged scale, a modified embodiment, and FIGURE 6 is a longitudinal section, partially in section of another modified embodiment.

Figure 1:
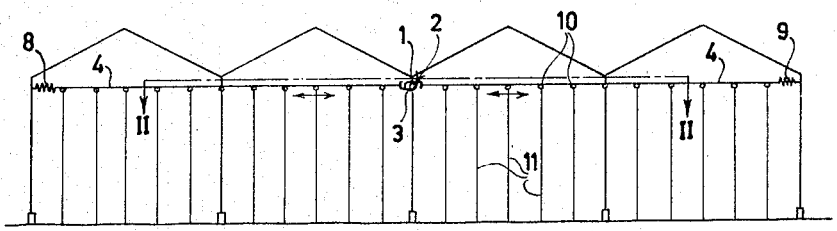
FIGURE 1 represents a cross section through a greenhouse, in which the device according to the invention has been arranged.
Figure 2:
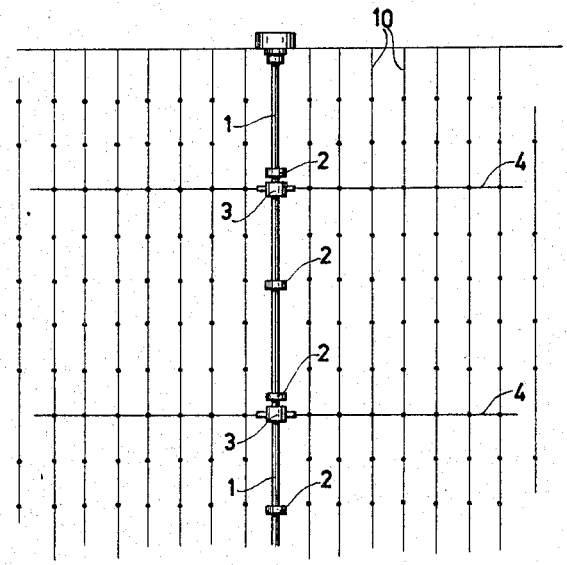
FIGURE 2 is a plan view of FIGURE 1, according to the arrows II—II.

In the figures a central driving shaft is denoted by 1. The shaft is mounted for rotation in bearings 2, which at the same time are points of suspension. The shaft is provided with eccentrics 3, two of which are visible in FIGURE 2, which are about in the middle of the cross connection ropes 4. The ends of the latter are connected by a loop to the oppositely situated hooks 5 and 6 of the ring 7. The cross connection ropes further include helical drawsprings 8 and 9, which in this case serve to ensure an attachment to the side walls of the greenhouse.

It is obvious that on rotation of the shaft 1 the cross connection ropes 4 can be set into a vibratory motion in the longitudinal direction by way of eccentrics 3, this vibratory motion also being imparted to the strings 10, which form a kind of network therewith, and further to the climbing ropes 11 and the plants 22. The motion imparted to the system of strings and plants is, as follows from the construction of the eccentric 3, continuously alternating. Thereby, each eccentric 3 constitutes a single cam means for producing uniform oscillation in opposite directions for the ropes 4 and thereby for the strings 10, the ropes 11, and the plants 22. The system of strings and plants is given a frequency substantially corresponding with the resonance frequency of the system of strings and plants. When maintaining the agitation by the eccentric during a certain time, a resonance motion of the plants is produced, which causes the pollination.

The right amplitude is selected by choosing the dimensions of the eccentric 3 and the number of vibrations can be easily regulated by the rotational velocity of the driving shaft. It is now possible to use the number of vibrations to produce resonance and the most effective amplitude, in order not to give rise to crack injuries in the plants. Due to this precise possibility of adjustment the device according to the invention can also be applied to the artificial pollination of young plants. In practice an amplitude of about 2 cm. appears to be very suitable. For the pollination of young plants the frequency vibration must be higher than in the event of mature plants.

In the known device with intermittent motion, the cross connection necessarily consisted of bars which, moreover, had to be supported at regular distances. The resonance vibration according to the present invention introduces a considerable simplification in this respect, because it can be kept going when simple stringlike cross connections 4 are utilized. These strings then must be connected to a fixed part of the greenhouse with the intermediary of springs 8 and 9.

The strings 10 can (in a way not shown) be supported by bearers so as to be capable of partaking in the vibratory motion at their ends, as for example by connection with slack ropes or hingedly suspended rods.

The strings can also be accommodated in transverse slots of such rod bearers, in which the strings can slide to and fro for the amplitude of travel.

In the sense of rotation of the shaft 1 according to the arrow P the hooks 5 and 6 are open on the side, which is opposed to the direction of rotation. The loops of the attachment ends of the cross connection 4 glide thereby from the hooks (which for that purpose have an arched shape) when the ring 7 owing to the presence of dirt, or like causes, should get stuck and thereby be taken along too far in rotating, whereby the ropes 4 might break.

It is obvious from the modified embodiment according to FIGURE 5 that instead of an eccentric disc 3, there may be employed eccentric cams 12 and 13 for driving the hooks 5 and 6. These are provided in a fixed ring 13a so as to be slidable in a longitudinal direction, the springs 14 ensuring that the hook ends follow the cam surface 12, 13 on the shaft 1.

According to the modified embodiment of FIGURE 6 the drive of a ring 7 by an eccentric 3 can be replaced by or be combined with a possibility for vibrating a ring 17, which is fixedly connected with the disc 3 and which directly or indirectly supports the cross connection 4, the vibration being effected through the interference of a fixed cam face 15, cooperating with cams 16 on the cross cut face of the disc, which is mounted on the shaft 3, the shaft 1 together with the ring 17 being capable of reciprocation in the longitudinal direction of the shaft 1.

Thus a vibratory motion can also be imparted to the cross connection ropes, transverse to their longitudinal direction.

The shaft 1 is driven by the rotationally driven sliding shaft 18 and a spring 19 receives the to and fro movement.

Through the interference of a timing mechanism for switching on and switching off the motor it is both possible to initiate automatically the vibration at a desired moment and to define the period in which vibration is effected.

As during a certain period when the plants are blossoming the ripeness of the pollen by way of experience can almost be indicated beforehand, the timing mechanism can often be applied for the automatic actuation of the device. This definite period normally coincides with the period in which the plants are in full growth. Generally the pollen is then ripe at the end of the afternoon.

In practice it is possible to cover a planted area of 5000 m.$^2$ with a single driving shaft.

What I claim is:

1. A method of artificially pollinating plants, in particular tomato vines cultivated in greenhouses, comprising supporting said plants as a unit and uniformly oscillating the same in opposite directions in a horizontal plane continuously as a unit.

2. A device for artificially pollinating plants comprising common support means for a plurality of plants and at least one single cam means for acting on said support means to produce oscillation thereof which is uniform in opposite directions.

3. A device for artificially pollinating plants comprising common support means for a plurality of plants including a displaceable member which is resiliently returnable to an original position, and single cam means for acting on said member to both displace the same from its original position and to restrict its return thereto such that the member undergoes oscillatory movement which is uniform in both directions.

4. A device for artificially pollinating plants comprising common support means for a plurality of plants including means enabling resilient displacement of said common support means, a rigid drive member, said support means extending on both sides of said drive member and means for driving said common support means in regular uniform displacement from the rigid drive member to produce uniform oscillation in said support means on each side of said drive member.

5. A device for artificially pollinating plants comprising common support means for a plurality of plants and means for acting on said common support means to produce uniform oscillatory movement thereof, the latter means comprising a rotatable shaft and an eccentric on said shaft for driving said support means, said eccentric having a circumferential surface which has a continuously varying distance with respect to the axis of rotation of said shaft.

6. A device as claimed in claim 5 wherein said common support means comprises members driven by said eccentric and extending on opposite sides of the shaft.

7. A device as claimed in claim 6 wherein said members extend approximately equal distances on opposite sides of the shaft.

8. A device as claimed in claim 6 wherein said common support means comprises a ring driven by said eccentric, hooks on said ring each engaging a respective one of said members, said hooks being open in a direction opposite the direction of rotation of the shaft.

9. A device as claimed in claim 6 comprising springs connecting said members to a fixed support.

10. A device as claimed in claim 5 wherein said eccentric is a cam, said support means further comprising spring loaded pins in circumferential follower contact with the cam.

References Cited by the Examiner

UNITED STATES PATENTS

| | | | |
|---|---|---|---|
| 1,306,209 | 6/1919 | Williams | 47—1.41 |
| 1,923,217 | 8/1933 | Lafferty. | |
| 2,430,659 | 11/1947 | Antles | 47—1.41 |
| 2,995,868 | 8/1961 | Casper | 47—1.41 |

ABRAHAM G. STONE, *Primary Examiner.*

R. E. BAGWILL, *Assistant Examiner.*